(12) United States Patent
Araki

(10) Patent No.: US 9,131,094 B2
(45) Date of Patent: Sep. 8, 2015

(54) APPLICATION EXECUTION TIME REDUCING METHOD

(71) Applicant: KYOCERA Document Solutions Inc., Osaka-shi, Osaka (JP)

(72) Inventor: Takashi Araki, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 65 days.

(21) Appl. No.: 14/313,940

(22) Filed: Jun. 24, 2014

(65) Prior Publication Data

US 2015/0002874 A1    Jan. 1, 2015

(30) Foreign Application Priority Data

Jun. 28, 2013    (JP) .................................. 2013-136317

(51) Int. Cl.
*H04N 1/00*    (2006.01)

(52) U.S. Cl.
CPC ......... *H04N 1/00925* (2013.01); *H04N 1/0097* (2013.01); *H04N 1/00938* (2013.01); *H04N 2201/0094* (2013.01)

(58) Field of Classification Search
CPC ... G06F 3/123; G06F 3/1248; G06F 9/45504; H04N 1/00962; H04N 1/0097; H04N 2201/0094; H04N 1/00925; H04N 1/00938

USPC .................................................. 358/1.1, 1.13
See application file for complete search history.

(56) References Cited

U.S. PATENT DOCUMENTS

2006/0190934 A1 *   8/2006   Kielstra et al. ................ 717/148

FOREIGN PATENT DOCUMENTS

| JP | 2005293407 | * 10/2005 | ................ G06F 9/46 |
| JP | 2005293407 A | 10/2005 | |

OTHER PUBLICATIONS

English translation of JP2005293407.*

* cited by examiner

*Primary Examiner* — Iriana Cruz
(74) *Attorney, Agent, or Firm* — Alleman Hall McCoy Russell & Tuttle LLP

(57) ABSTRACT

An application execution time reducing method according to one aspect of the present disclosure includes a function registering step, a native function step, and a native function deleting step. In the function registering step, when processing of an application in a software structure having a native function which is a basic component is started, information about the native function is registered onto a platform on which the native function can be executed. In the native function step, the native function is executed on the platform by using the information about the native function. In the native function deleting step, when the processing of the application is quitted, the information about the native function is deleted from the platform.

2 Claims, 5 Drawing Sheets

APPLICATION EXECUTION TIME REDUCING METHOD

INCORPORATION BY REFERENCE

This application is based upon and claims the benefit of priority from the corresponding Japanese Patent Application No. 2013-136317 filed on Jun. 28, 2013, the entire contents of which are incorporated herein by reference.

BACKGROUND

The present disclosure relates to a method for reducing execution time of an application installed on a device.

A typical image forming apparatus that is an MFP (Multi-function Peripheral) such as a printer, a multifunction printer, multifunction peripheral equipment, or a multifunction machine has an execution environment for Java (registered trademark). Such a typical image forming apparatus has a mechanism that allows execution of an application (hereinafter, referred to as "Java application") created in Java language. By using an interface of a function provided by the image forming apparatus, the Java application can execute various processes using the function of the image forming apparatus. Thus, if a user, by using an interface of a predetermined function, creates a Java application that realizes a function not provided by the image forming apparatus, the user can install the Java application on the image forming apparatus. In devices such as the typical image forming apparatus on which a Java application can be installed, measures are taken so as to facilitate execution of an application. For example, a conventional information processing device capable of executing an application allows a function of each application to be called without a user performing different input operations for respective applications.

SUMMARY

An application execution time reducing method according to one aspect of the present disclosure includes a function registering step, a native function step, and a native function deleting step. In the function registering step, when processing of an application in a software structure having a native function which is a basic component is started, information about the native function is registered onto a platform on which the native function can be executed. In the native function step, the native function is executed on the platform by using the information about the native function. In the native function deleting step, when the processing of the application is quitted, the information about the native function is deleted from the platform.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments for carrying out the present disclosure will be described with reference to the drawings. The present disclosure relates to a method for reducing execution time of a Java application (hereinafter, simply referred to as "application") by directly using a basic component (hereinafter, referred to as "native function") of software in an image forming apparatus without using each time software (hereinafter, referred to as "middleware") positioned between OS (Operating System) which is a function provided by the image forming apparatus and an application.

Figure 1:
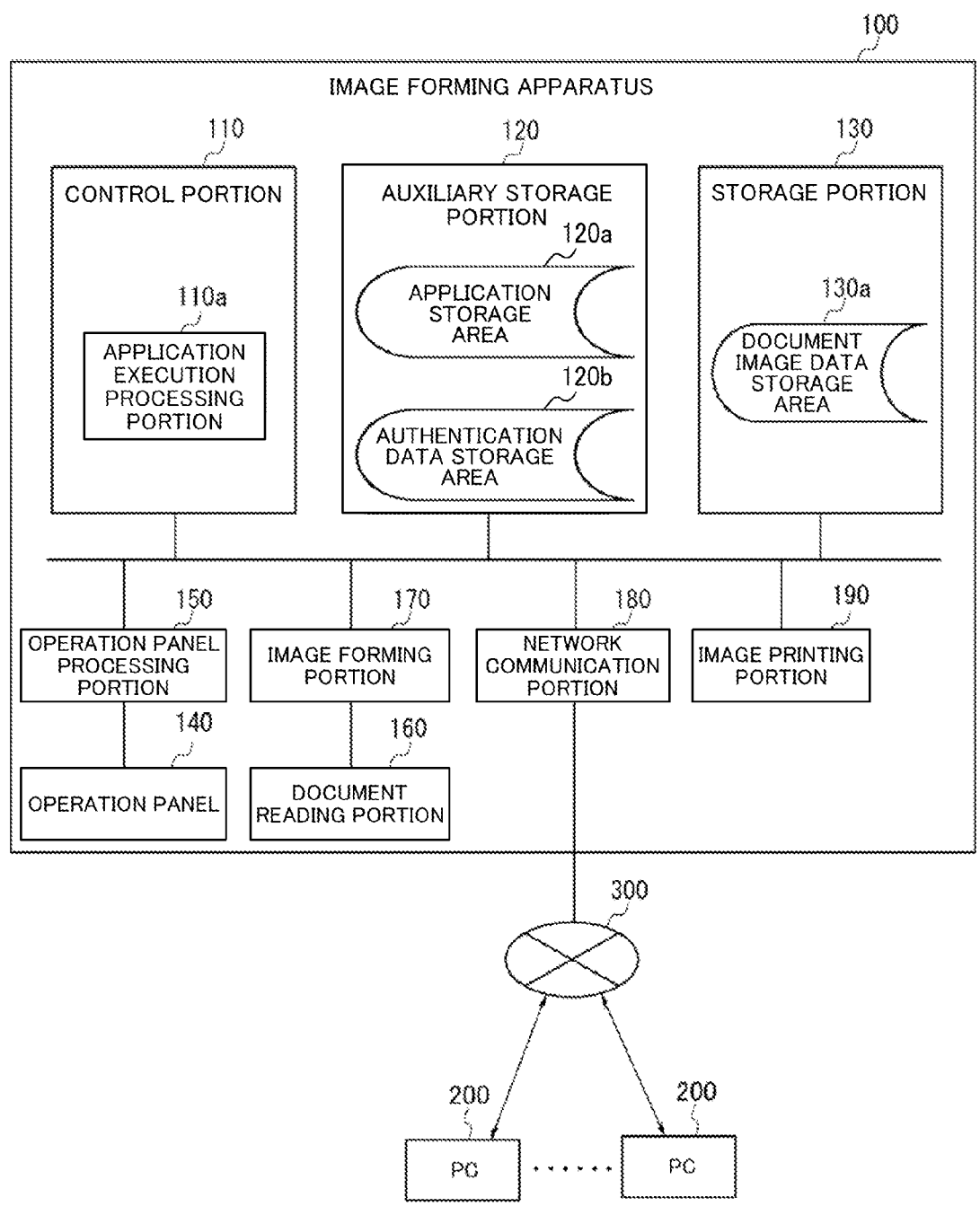
FIG. 1 is a diagram showing the functional configuration of an image forming apparatus according to an embodiment of the present disclosure.

The functional configuration of an image forming apparatus 100 according to the present embodiment will be described with reference to FIG. 1. The image forming apparatus 100 shown in FIG. 1 includes a control portion 110, an auxiliary storage portion 120, a storage portion 130, an operation panel 140, an operation panel processing portion 150, a document reading portion 160, an image forming portion 170, a network communication portion 180, and an image printing portion 190. These portions are connected via a bus or the like. The control portion 110 includes an application execution processing portion 110*a*. The auxiliary storage portion 120 includes an application storage area 120*a* and an authentication data storage area 120*b*.

The control portion 110 includes a main storage device such as a RAM or a ROM and a control device such as an MPU (Micro Processing Unit) or a CPU (Central Processing Unit). In addition, the control portion 110 has a controller function relevant to interfaces of various I/O, a USB (Universal Serial Bus), a bus, other hardware, and the like, and controls the entire image forming apparatus 100.

When a user specifies, from the operation panel 140 or a PC (personal computer) 200, an application 510 installed on the image forming apparatus 100, the application execution processing portion 110*a* executes the specified application.

The auxiliary storage portion 120 is an auxiliary storage device such as a flash memory, and stores a program and data for processing executed by the control portion 110.

The application storage area 120*a* stores a program and data for an application created by a user other than programs provided by the image forming apparatus 100.

The authentication data storage area 120*b* stores data for authenticating an application created by a user.

The storage portion 130 is a storage device composed of a hard disk drive, and stores a program and data for processing executed by the control portion 110.

A document image data storage area 130*a* temporarily stores document image data read by the document reading portion 160, document image data received by the network communication portion 180, and the like.

The operation panel 140 displays an operation screen and receives a user's operation. The operation panel processing portion 150 performs processing of displaying operation items to be selected by a user on the operation panel 140, and processing for allowing input of a user's operation from the operation panel 140.

The document reading portion 160 reads a document set on a platen of the image forming apparatus 100, and the document set on the platen can be read by a user performing a reading request from the operation panel 140.

The image forming portion 170 converts document image data read by the document reading portion 160 into image data of a printable image or an image that can be transmitted by FAX or E-mail.

The network communication portion 180 includes a detachable LAN interface for establishing connection to a network 300. In addition, the image forming apparatus 100 can communicate with devices such as the PC 200 connected to the network 300, by the network communication portion 180.

The image printing portion 190 has a function to print image data for which a user performs a print request, on a sheet.

Figure 2:
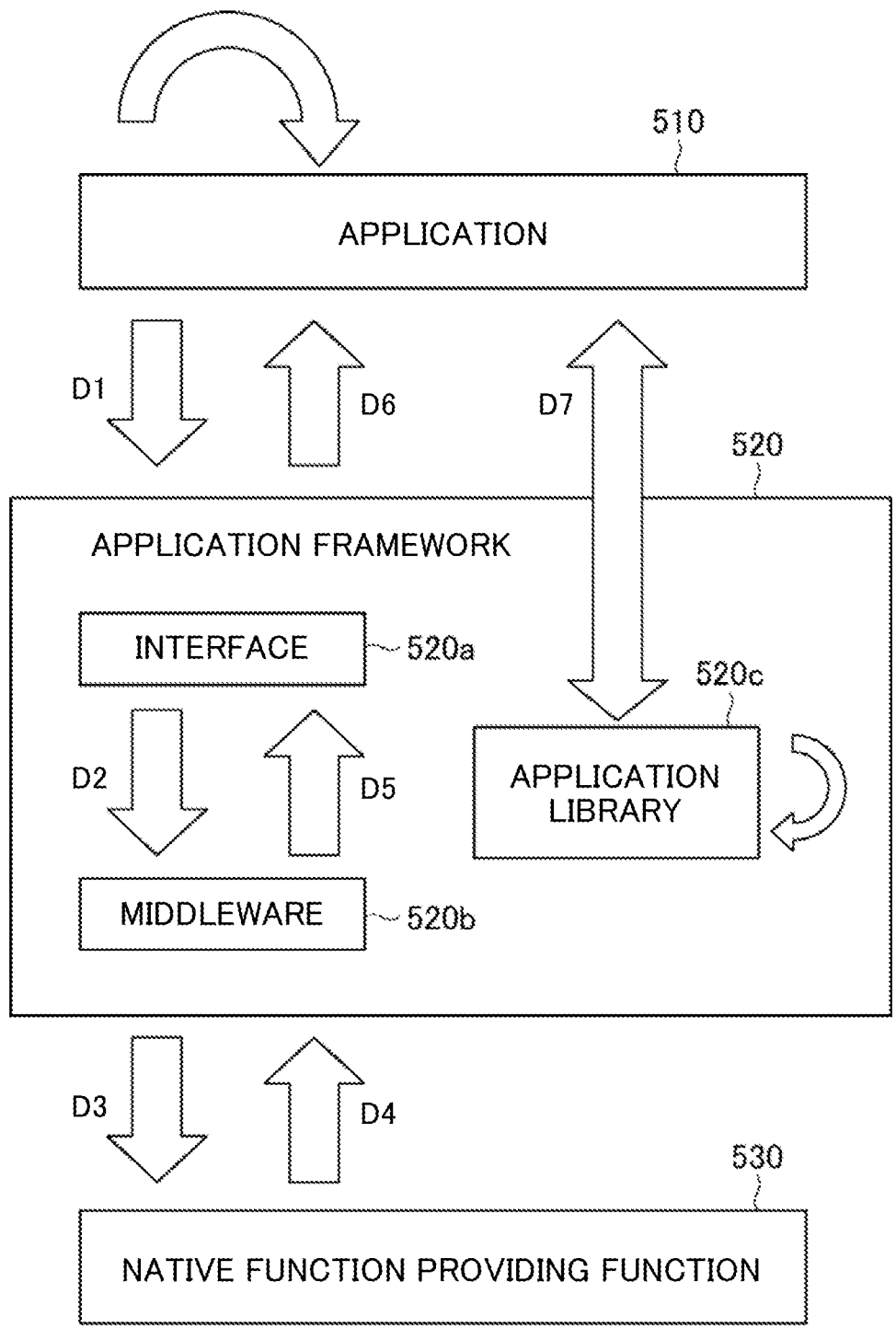
FIG. 2 is a diagram showing a software structure for executing an application in the image forming apparatus according to the embodiment of the present disclosure.

Next, the software structure for executing an application according to the embodiment of the present disclosure will be described with reference to FIG. 2. As shown in FIG. 2, the software structure for executing an application is composed of the application 510, an application framework 520, and a native function providing function 530. The application framework 520 is composed of an interface 520a, middleware 520b, and an application library 520c. In this software structure, the application 510 and the interface 520a are applied to Java (registered trademark), and therefore they are included in a Java layer. In addition, the middleware 520b, the application library 520c, and the native function providing function 530 are applied to a native function, and therefore they are included in a native layer.

The application 510 is a program created by a user other than functions provided by the image forming apparatus 100.

The application framework 520 includes software, a program, and a library used by the application 510 when the application 510 is executed by the control portion 110.

The interface 520a is a program for connecting the application 510 and the middleware 520b. The application 510 executes the middleware 520b via the interface 520a.

The middleware 520b directly causes the OS to operate, thereby providing a function for executing an application. The middleware 520b authenticates the application 510, when executed from the application 510.

The application library 520c is a library used by an application when the application executes a native function not via the middleware 520b. In the application library 520c, an environment (hereinafter, referred to as "platform") that allows execution of a native function is provided. On the platform, information about a native function for executing the native function is registered. The native function can be executed by using the information about the native function.

The native function providing function 530 provides information about a native function to be executed by the middleware 520b. The middleware 520b can execute a native function by using information about a native function.

In the software structure shown in FIG. 2 for executing an application, first, as indicated by an arrow D1, the interface 520a is called from the application 510. Next, as indicated by an arrow D2, the middleware 520b is called from the interface 520a. Next, as indicated by an arrow D3, the native function providing function 530 is called from the middleware 520b, and as indicated by an arrow D4, the middleware 520b takes information about a native function from the native function providing function 530. Then, the middleware 520b executes the native function by using the information about the native function. Next, as indicated by an arrow D5, the middleware 520b notifies the interface 520a of finish. Next, as indicated by an arrow D6, the interface 520a notifies the application 510 of finish. As described above, normally, an application is executed while processing is repeatedly performed along the arrows D1 to D6. On the other hand, when the application 510 instructs the application library 520c to execute a native function, as indicated by an arrow D7, the application library 520c executes the native function by using information about the native function registered in the application library 520c. The details of processing of the application 510 executing a native function not via the middleware 520b will be described later.

Figure 3:
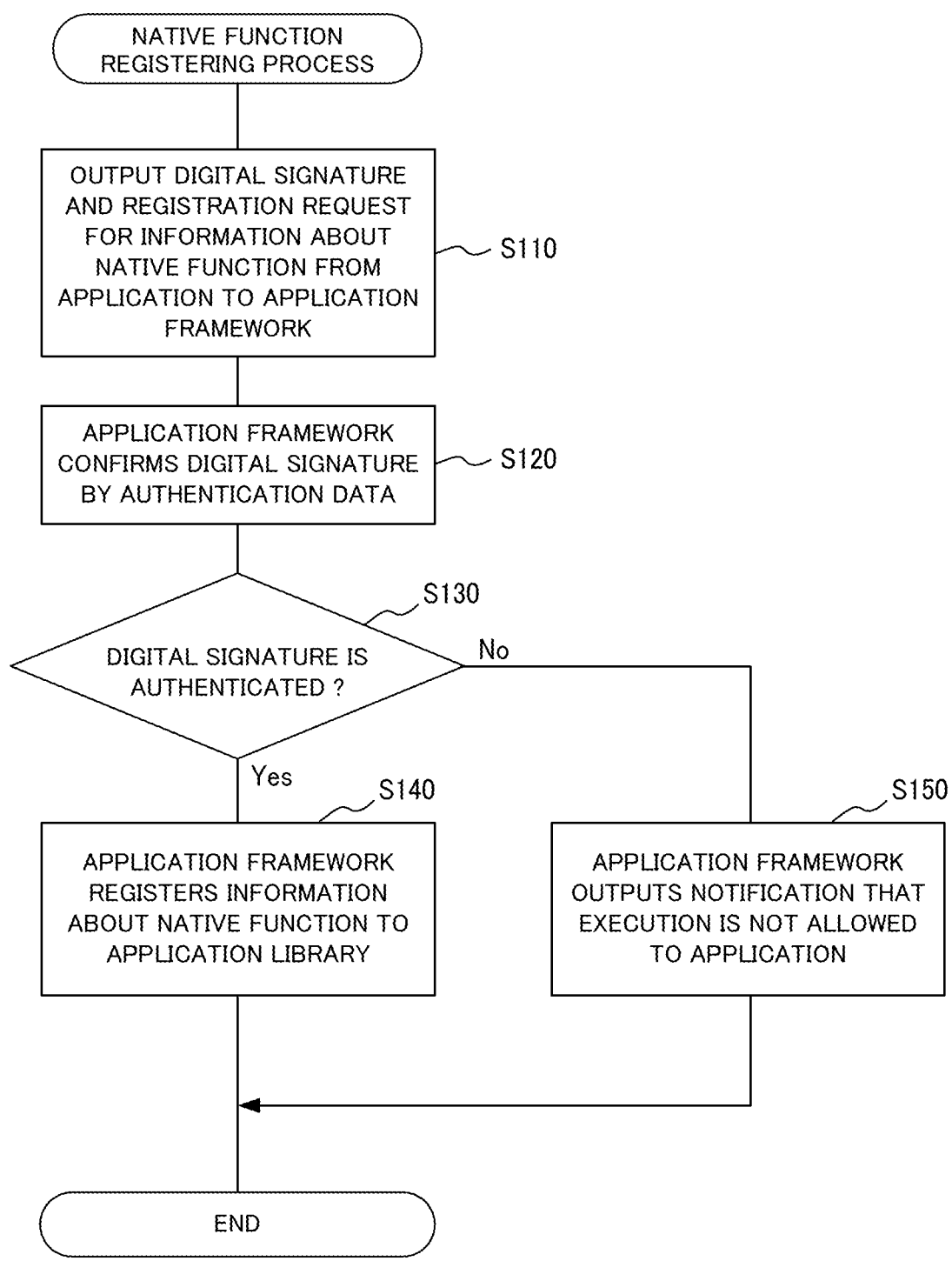
FIG. 3 is a flowchart of a native function registering process in the image forming apparatus according to the embodiment of the present disclosure.

Next, application execution processing according to the embodiment of the present disclosure will be described with reference to FIG. 2 and FIG. 3. When a user performs, from the operation panel 140 or the PC 200, an operation of specifying and starting the application 510 installed on the image forming apparatus 100, the operation information is reported to the control portion 110. Then, the control portion 110 activates the application execution processing portion 110a. The activated application execution processing portion 110a takes a program for the specified application 510 from the application storage area 120a, and starts the application 510.

In the case where the application 510 is set to execute a native function not via the middleware 520b, the application 510 executes a native function registering process when starting processing, next, executes a native function process, and then executes a native function deleting process when quitting processing.

First, the native function registering process will be described step by step with reference to the native function registering process shown in FIG. 3.

(Step S110)

First, the application 510 outputs a digital signature and a registration request for information about a native function to be executed to the application framework 520. The application 510 that is set to execute a native function not via the middleware 520b has the digital signature in advance.

(Step S120)

Next, when having received the digital signature and the registration request for the information about the native function, the application framework 520 takes authentication data from the authentication data storage area 120b, and confirms the digital signature by using the authentication data.

(Step S130)

Next, the application framework 520 determines whether or not the digital signature is authenticated. If the digital signature is authenticated (Yes in step S130), the process proceeds to step S140. If the digital signature is not authenticated (No in step S130), the process proceeds to step S150.

(Step S140)

In the case of Yes in step S130, the application framework 520 registers the information about the native function onto the platform of the application library 520c, and outputs notification of finish of the native function registering process to the application 510. Thus, the native function registering process is ended.

(Step S150)

In the case of No in step S130, the application framework 520 outputs notification that the execution is not allowed, to the application 510, and then the native function registering process is ended. When having received the notification that the execution is not allowed, the application 510 stops the execution.

Figure 4:
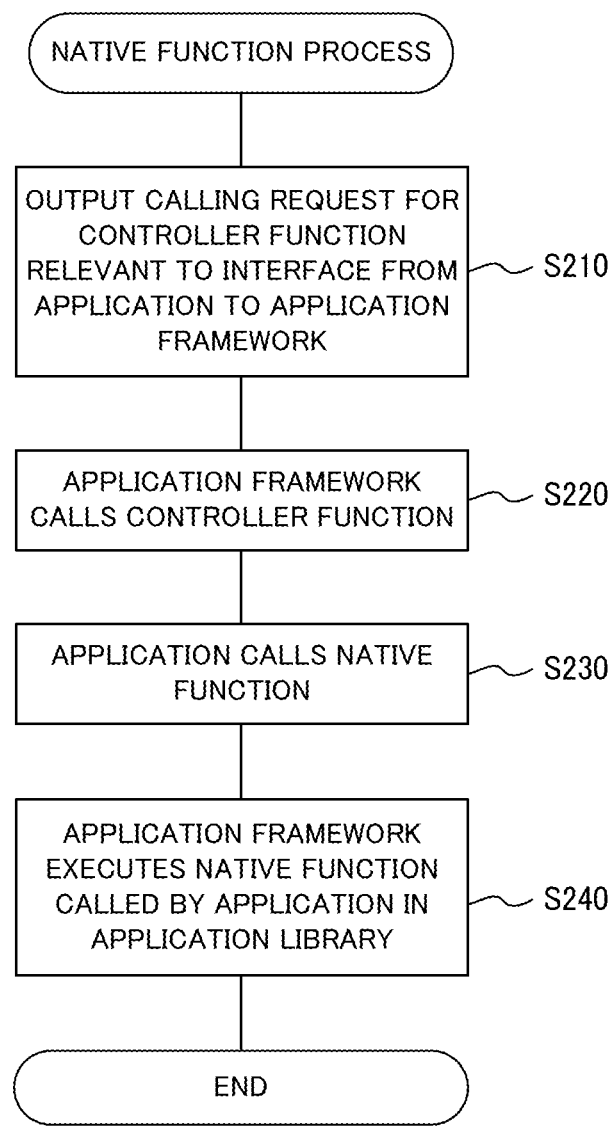
FIG. 4 is a flowchart of a native function process in the image forming apparatus according to the embodiment of the present disclosure.

Next, the native function process will be described step by step with reference to the native function process shown in FIG. 4.

(Step S210)

First, when having received the notification of finish of the native function registering process, the application 510 outputs a calling request for a controller function relevant to an interface of hardware from the application 510 to the application framework 520.

(Step S220)

Next, the application framework 520 calls the controller function relevant to the interface.

(Step S230)

Next, the application 510 calls the native function.

(Step S240)

Next, the application framework 520 executes the native function called by the application 510 on the platform of the application library 520c, and outputs notification of finish of the native function process to the application 510. Thus, the native function process is ended.

Figure 5:
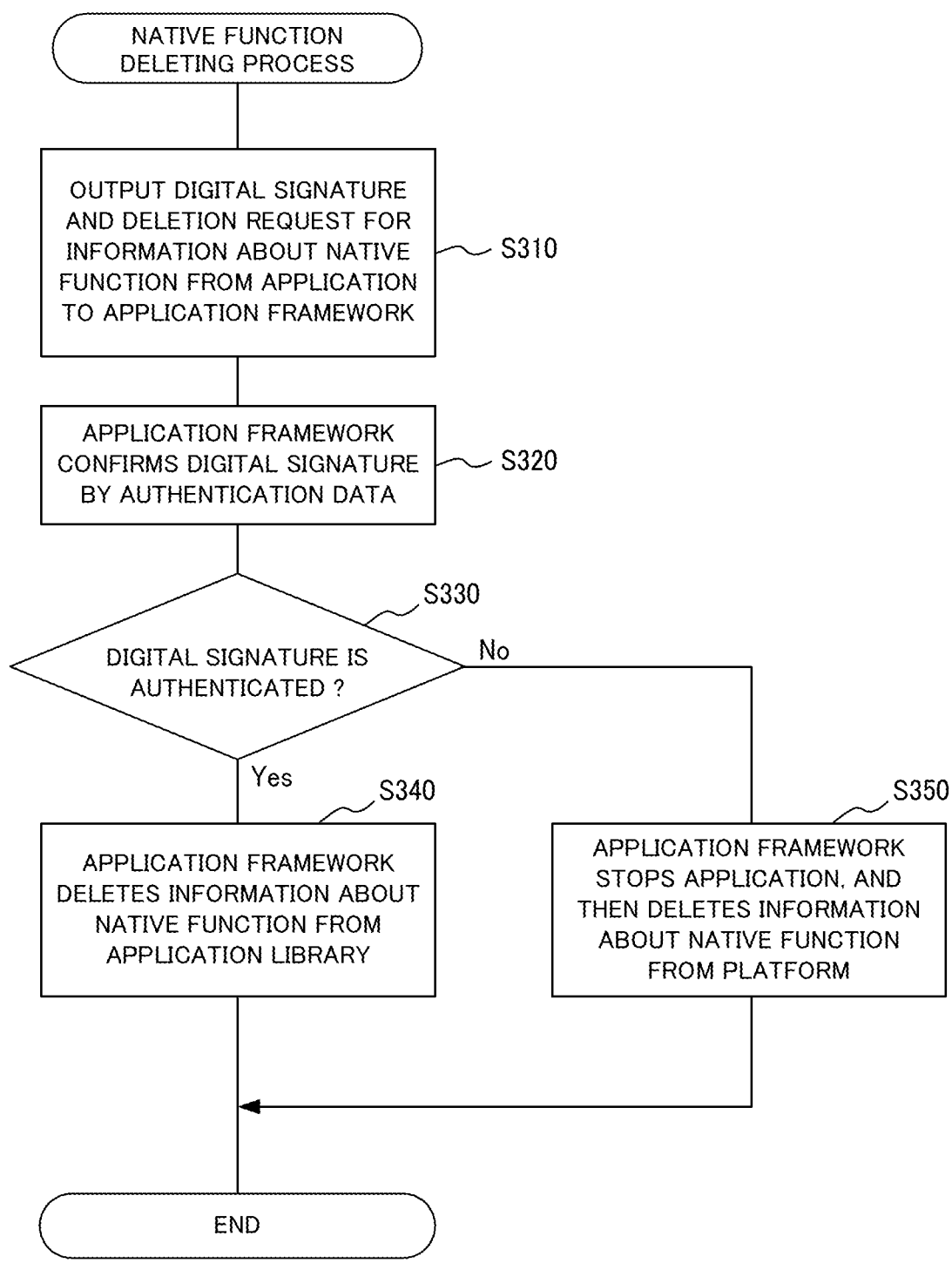
FIG. 5 is a flowchart of a native function deleting process in the image forming apparatus according to the embodiment of the present disclosure.

Next, the native function deleting process will be described step by step with reference to the native function deleting process shown in FIG. 5.

(Step S310)

First, when having received the notification of finish of the native function process, the application 510 outputs the digital signature and a deletion request for the information about the called native function to the application framework 520.

(Step S320)

Next, when having received the digital signature and the deletion request for the information about the native function, the application framework 520 takes authentication data from the authentication data storage area 120b, and confirms the digital signature by using the authentication data.

(Step S330)

Next, the application framework 520 determines whether or not the digital signature is authenticated. If the digital signature is authenticated (Yes in step S330), the process proceeds to step S340. If the digital signature is not authenticated (No in step S330), the process proceeds to step S350.

(Step S340)

In the case of Yes in step S330, the application framework 520 deletes the information about the native function registered on the platform of the application library 520c, and outputs notification of finish of the native function deleting process to the application 510. Thus, the native function deleting process is ended.

(Step S350)

In the case of No in step S330, the application framework 520 stops execution of the application 510, and deletes the information about the native function registered on the platform of the application library 520c.

As described above, the application 510 installed on the image forming apparatus 100 executes a native function not via the middleware 520b, whereby execution time of processing by the middleware 520b is eliminated. As a result, execution time of the application 510 can be reduced. In addition, when the application 510 executes a native function, the application framework 520 confirms a digital signature that the application 510 has, and permits the application 510 to execute the native function when the digital signature is authenticated. Thus, security threat due to inappropriate processing performed by the application 510 that is not permitted executing a native function not via the middleware 520b can be prevented as in the case of using the middleware 520b. Therefore, in the case where the application 510 executes processing in which data is frequently accessed, processing in which calculation is repeatedly performed, or the like, the processing time is greatly reduced as compared to the conventional case. Therefore, a user's stress due to waiting time is reduced. In addition, security of the application 510 of the present disclosure is ensured. By installing a plurality of such applications 510 on the image forming apparatus 100, it becomes possible to provide a high-value-added image forming apparatus 100 capable of coping with various requests from users.

In the above embodiment, the case where the application 510 is installed on the image forming apparatus 100 has been described as an example. However, the present disclosure is generally applicable to devices having software so that functions are executed by the software.

In the above embodiment, the case of Java application has been described as an example. However, the present disclosure is not limited to Java application. Any application created in a language for which an execution environment is prepared in a device can be applied in the same manner as described above.

Such an application execution time reducing method of the present disclosure can reduce execution time of an application created by using a function provided by a device.

The present disclosure is suitable to a device such as an image forming apparatus on which an application can be installed, but is not limited to a device and is also applicable to a system in which software having a native function is installed.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An application execution time reducing method performed by an image forming apparatus that includes a non-transitory computer software program organized according to a software structure, for executing an application on a processor of the image forming apparatus, the software structure including the application, an application framework, and a native function providing function, and the application framework including an interface, a middleware, and an application library, the method comprising:

executing a first process, in which the application executes the native function providing function via the middleware by:

calling the interface from the application;

calling the middleware from the interface;

calling the native function providing function via the middleware;

authenticating the application by the middleware;

executing the middleware via the interface from the application;

executing the native function providing function from the middleware; and taking information about the native function from the native function providing function;

executing the native function by using the information about the native function;

notifying the interface of a finish of the application from the middleware; and notifying the application of the finish of the application from the interface;

wherein the middleware authenticates the application when executed from the application; and executing a second process, in which the application executes the native function providing function while bypassing the middleware by:
  registering the information about the native function onto a platform in the application library, when a process of the application is started;
  executing the native function on the platform by using the information about the native function; and
  deleting the information about the native function from the platform, when the process of the application is terminated,
  wherein the information about the native function is registered onto the platform when a digital signature included in the application is authenticated, and the application is terminated when the digital signature is not authenticated;
wherein the application and the interface are implemented in JAVA®, and the middleware, the application library, and the native function providing function are used to implement the native function.

2. The application execution time reducing method according to claim 1, wherein
  when the digital signature is authenticated, the information about the native function is deleted from the platform, and
  when the digital signature is not authenticated, the application is quitted, and then the information about the native function is deleted from the platform.

* * * * *